No. 646,943. Patented Apr. 10, 1900.
S. R. BAILEY.
FOOT REST FOR CARRIAGES.
(Application filed Feb. 27, 1900.)
(No Model.)

Witnesses.
Lauritz N. Möller
Charles A. Harris.

Inventor.
Samuel R. Bailey.
by Alban Andrew
his atty.

THE NORRIS PETERS CO., PHOTO-LITHO., WASHINGTON, D. C.

UNITED STATES PATENT OFFICE.

SAMUEL R. BAILEY, OF AMESBURY, MASSACHUSETTS.

FOOT-REST FOR CARRIAGES.

SPECIFICATION forming part of Letters Patent No. 646,943, dated April 10, 1900.

Application filed February 27, 1900. Serial No. 6,733. (No model.)

*To all whom it may concern:*

Be it known that I, SAMUEL R. BAILEY, a citizen of the United States, residing at No. 188 Main street, Amesbury, in the county of Essex and State of Massachusetts, have invented new and useful Improvements in Foot-Rests for Carriages or other Vehicles, of which the following is a specification.

This invention relates to improvements in adjustable foot-rests for carriages or other vehicles; and it has for its object to readily adjust the position of the foot-rest relative to the seat and the length of the lower limbs of the driver or occupant of the vehicle, so as to produce a proper and comfortable foot-support, as will hereinafter be more fully shown and described, reference being had to the accompanying drawings, wherein—

Figure 1:
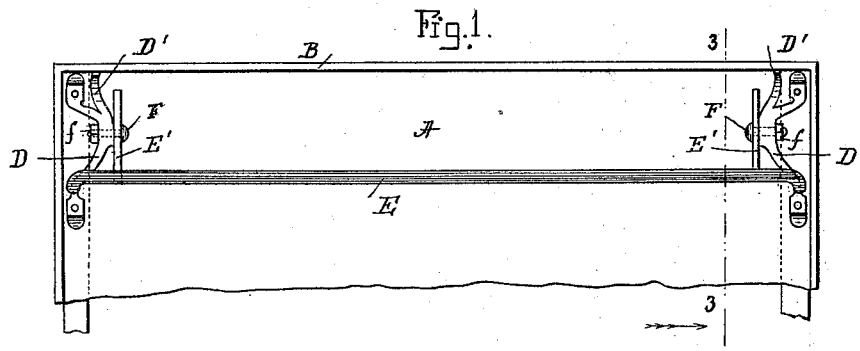
Figure 2:
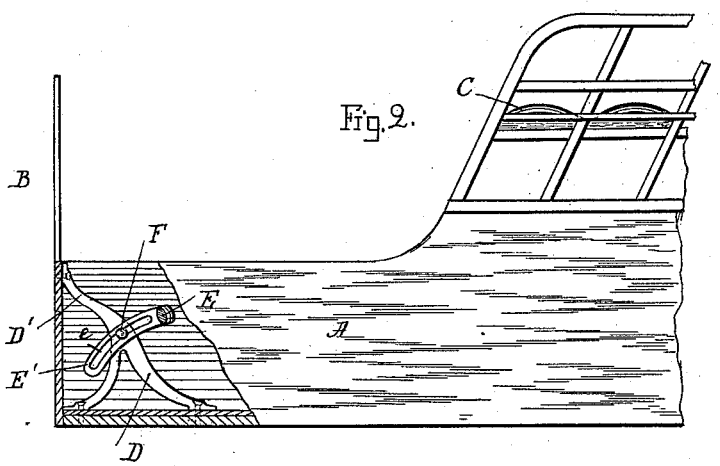
Figures 3, 4:
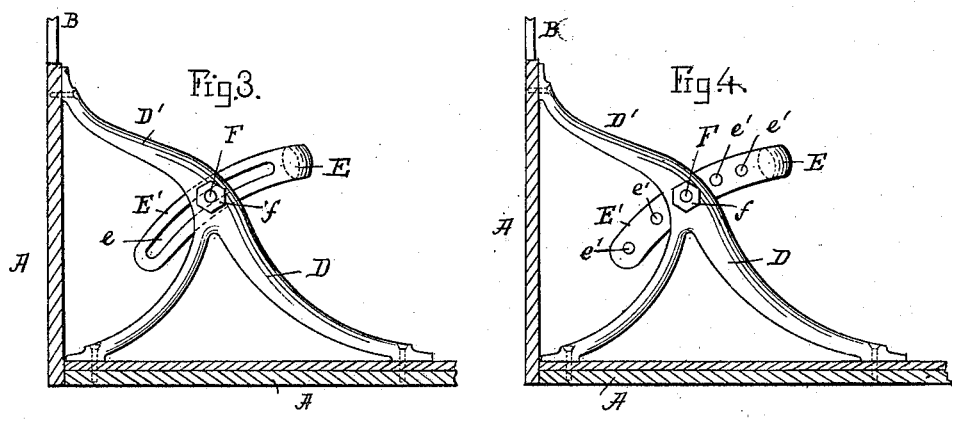

Figure 1 represents a top plan view of the improved adjustable foot-rest, shown as applied to the forward portion of the body of a vehicle. Fig. 2 represents a side elevation of the invention, shown as applied to a vehicle-body, parts of the latter being shown in section. Fig. 3 represents an enlarged section on the line 3 3 shown in Fig. 1, and Fig. 4 represents a similar view showing a modification of the invention.

Similar letters refer to similar parts wherever they occur on the different parts of the drawings.

In Figs. 1 and 2, A represents the body of the vehicle, on which B is the dasher and C the seat, as usual.

To the vehicle-body are secured a pair of metal brackets or supports D D, as shown. In practice I prefer to make in one piece with each such support or bracket D an upwardly-extending arm D', the upper end of which is adapted to be secured to the forward upright portion of the carriage-body, as shown in the drawings; but such portion D' may be dispensed with, if so desired, without departing from the essence of my invention.

E represents the adjustable foot-rest bar provided at its ends with preferably slightly-curved shanks E', E', each one of the latter having a slotted perforation $e$, adapted to receive a pivot-bolt F, inserted through a perforation in the support D and provided with a fastening-nut $f$, by means of which the said shank may be secured to the bracket or support D after the foot-rest bar E has been adjusted relative to the seat of the vehicle. This construction permits the foot-rest to be adjusted to and from the seat or oscillated on the fulcra F F and afterward secured in position to suit the requirements of the occupant of the vehicle.

Instead of making each curved shank E' slotted, as above described, it may be provided with a series of perforations $e'$ $e'$, as shown in Fig. 4, through either one of which the fastening-bolt F may be inserted for the purpose of adjusting the position of the foot-rest E relative to the seat and securing it in such position.

By making the shanks E' E' slightly curved, as shown, the foot-rest bar E may be adjusted to and from the seat of the vehicle, according to the length of the limbs of the person occupying the front seat, without unduly raising the said foot-rest bar.

The invention is very simple in construction and is composed of very few parts, by means of which the foot-rest can readily be adjusted, as hereinabove described.

What I wish to secure by Letters Patent and claim is—

The herein-described adjustable foot-rest for vehicles, consisting of brackets or supports D, D, secured to the carriage-body, combined with a foot-rest bar E, having slotted or perforated shanks E', E', and fastening or pivot bolts F, F, for the purpose of adjusting said foot-rest bar E, and shanks, relative to said supports and securing said parts in position after being adjusted substantially as and for the purpose set forth.

In testimony whereof I have hereunto set my hand in presence of two subscribing witnesses.

SAMUEL R. BAILEY.

Witnesses:
ALBAN ANDRÉN,
LAURITZ N. MÖLLER.